(12) United States Patent
Oguchi et al.

(10) Patent No.: US 10,306,907 B2
(45) Date of Patent: *Jun. 4, 2019

(54) ACIDIC OIL-IN-WATER TYPE EMULSIFIED CONDIMENT

(71) Applicant: KEWPIE CORPORATION, Tokyo (JP)

(72) Inventors: Kaori Oguchi, Tokyo (JP); Koji Nishi, Tokyo (JP)

(73) Assignee: KEWPIE CORPORATION, Tokyo (JP)

(*) Notice: Subject to any disclaimer, the term of this patent is extended or adjusted under 35 U.S.C. 154(b) by 122 days.

This patent is subject to a terminal disclaimer.

(21) Appl. No.: 15/100,290

(22) PCT Filed: Nov. 27, 2014

(86) PCT No.: PCT/JP2014/081477
§ 371 (c)(1),
(2) Date: May 27, 2016

(87) PCT Pub. No.: WO2015/080232
PCT Pub. Date: Jun. 4, 2015

(65) Prior Publication Data
US 2017/0000177 A1    Jan. 5, 2017

Related U.S. Application Data

(63) Continuation-in-part of application No. PCT/JP2013/082259, filed on Nov. 29, 2013.

(30) Foreign Application Priority Data

Nov. 29, 2013 (JP) .................................. 2013-248157

(51) Int. Cl.
*A23L 27/00* (2016.01)
*A23L 27/60* (2016.01)

(52) U.S. Cl.
CPC .............. *A23L 27/80* (2016.08); *A23L 27/60* (2016.08); *A23V 2002/00* (2013.01)

(58) Field of Classification Search
CPC ....................................................... A23L 27/80
See application file for complete search history.

(56) References Cited

U.S. PATENT DOCUMENTS

| | | | |
|---|---|---|---|
| 6,060,106 A * | 5/2000 | Breitbart | A23L 29/212 426/573 |
| 7,662,421 B2 | 2/2010 | Kobayashi et al. | |
| 2002/0009518 A1* | 1/2002 | Soe | A23D 7/011 426/33 |
| 2002/0076476 A1 | 6/2002 | Kuil et al. | |
| 2003/0203096 A1 | 10/2003 | Hamm et al. | |
| 2005/0089621 A1 | 4/2005 | Aquino et al. | |
| 2005/0123655 A1* | 6/2005 | Kobayashi | A23L 3/3418 426/106 |
| 2012/0053251 A1* | 3/2012 | Ervin | A23D 7/0053 514/784 |
| 2012/0183669 A1* | 7/2012 | Oguchi | A23L 27/60 426/605 |

FOREIGN PATENT DOCUMENTS

| | | |
|---|---|---|
| CN | 1298245 | 2/2007 |
| EP | 2 561 764 | 2/2013 |
| JP | 9-23844 | 1/1997 |
| JP | 9-23845 | 1/1997 |
| JP | 3375925 B2 | 7/2001 |
| JP | 2004-512037 A | 4/2004 |
| JP | 2005-253426 | 9/2005 |
| JP | 2010-051192 A | 3/2010 |
| JP | 2013-000095 A | 1/2013 |
| WO | 2012/001770 A1 | 1/2012 |
| WO | 2013/135456 | 9/2013 |

OTHER PUBLICATIONS

Machine translation of JP 09-023844, publication date Jan. 1997 to Kono. pp. 1-5. (Year: 1997).*
Extended European Search Report dated Jun. 23, 2017 in corresponding European patent application No. 148660196.0.
Office Action dated May 8, 2018 in corresponding Japanese patent application No. 2015-551004, with English Machine Translation.
Kagawa Aya Editorial supervision, fourth revision of food composition table, Joshi-Eiyo-Daigaku Shuppandbu, 1994, p. 192-193.
Hideaki Kobayashi et al., "Protection against Oxidation in Mayonnaise by the Control of Dissolved Oxygen", Oreo Science, 2005, vol. 5, p. 473-479.
R. Gomez et al., "Water activity and chemical composition of some food emulsions", Food Chemistry, 1992, vol. 45, p. 91-93.
Office Action dated Oct. 16, 2018 in corresponding Chinese Patent Application No. 201480065183.3, with English Translation.
Office Action dated Jan. 29, 2019 in Malaysian Patent Application No. PI 2016701863.
Schmidt et al., "Appendix E: Water Activity Values of Select Food Ingredients and Products", Water Activity in Foods, Sep. 25, 2017, Blackwell Publishing Ltd., Oxford, UK, XP055180892, pp. 407-420.

* cited by examiner

*Primary Examiner* — Jenna A Watts

(74) *Attorney, Agent, or Firm* — Wenderoth, Lind & Ponack, L.L.P.

(57) ABSTRACT

Disclosed is an acidic oil-in-water type emulsified condiment comprising 1 to 40% by mass of an edible oil, 30 to 60% by mass of water, a thickener, a yolk, a volatile acid, and a nonvolatile acid, wherein the mass ratio between the content of the volatile acid and the content of the nonvolatile acid is 1:50 to 20:1, and the acidic oil-in-water type emulsified condiment has a dissolved oxygen concentration of 0.1 to 10% $O_2$, a pH of 3.0 to 4.0, a water activity of 0.90 to 0.96, and a viscosity (20° C.) of 50 Pa·s or higher.

15 Claims, 1 Drawing Sheet

ACIDIC OIL-IN-WATER TYPE EMULSIFIED CONDIMENT

FIELD OF THE INVENTION

The present invention relates to an acidic oil-in-water type emulsified condiment. More specifically, the present invention relates to an acidic oil-in-water type emulsified condiment that is smooth and resists cracking or splitting even when baked as a topping on bread or the like.

BACKGROUND OF THE INVENTION

Acidic oil-in-water type emulsified condiments easily form curved toppings on the surface of food products such as bread, pizza, pasta, meat, or vegetables, for example, by discharge from a narrow-mouthed nozzle and line drawing. The resulting food products are baked in an oven, a steamer, or the like so that the seasoning ingredients can be spread over the surface of the food products and the appearance of the food products can also be improved. Use of a specific thickener has previously been proposed in order to prevent oils from separating or toppings from coining off when such an acidic oil-in-water type emulsified condiment is used as a topping on food products and then baked (Patent Literatures 1 and 2).

CITATION LIST

Patent Literature

Patent Literature 1: Japanese Patent No. 3375925
Patent Literature 2: WO2012/001770

SUMMARY OF THE INVENTION

Technical Problem

The conventional acidic oil-in-water type emulsified condiments, however, when used as toppings on food products such as bread or pizza and baked, might impair the appearance of the food products because the surface of the toppings cracks or splits due to the swelling of the food products during the baking or due to external forces generated, for example, upon cutting of the baked food products. Particularly, the surface of toppings of the emulsified condiments discharged from a narrow-mouthed nozzle and line-drawn is susceptible to cracking or splitting.

Thus, an object of the present invention is to provide an acidic oil-in-water type emulsified condiment that resists cracking or splitting when baked. A further object of the present invention is to provide an acidic oil-in-water type emulsified condiment that can form a curved topping even by discharge from a narrow-mouthed nozzle and line drawing and resists cracking or splitting when baked.

Solution to Problem

The present inventors have conducted detailed studies on ingredients, etc., in the acidic oil-in-water type emulsified condiment to attain the objects mentioned above, and consequently found that, unexpectedly, the baked acidic oil-in-water type emulsified condiment can be prevented from cracking or splitting, by decreasing the pH to 4.0 or lower and adjusting the water activity to 0.90 to 0.96. The decreased pH of the acidic oil-in-water type emulsified condiment might drastically change its taste or cause rust to form on metal parts of production facilities or containers for the acidic oil-in-water type emulsified condiment. In this respect, the present inventors have found that a volatile acid, such as acetic acid, which has heretofore been used as an acid agent for acidic oil-in-water type emulsified condiments, is used in combination with a nonvolatile acid such that the amounts of the volatile acid and the nonvolatile acid used are set to a specific ratio, whereby cracking or splitting caused by baking can be prevented, rust formation in production facilities, etc., is not promoted, and the taste is improved with reduced sourness. On the basis of these findings, the present invention has been completed.

Specifically, the present invention provides an acidic oil-in-water type emulsified condiment comprising
  1 to 40% by mass of an edible oil,
  30 to 60% by mass of water,
  a thickener, a yolk, a volatile acid, and a nonvolatile acid, wherein the mass ratio between the content of the volatile acid and the content of the nonvolatile acid is 1:50 to 20:1, and
  the acidic oil-in-water type emulsified condiment has a dissolved oxygen concentration of 0.1 to 10% O2,
  a pH of 3.0 to 4.0,
  a water activity of 0.90 to 0.96, and
  a viscosity (20° C.) of 50 Pa·s or higher.

Advantageous Effects of Invention

The acidic oil-in-water type emulsified condiment of the present invention can prevent its surface from cracking or splitting, because of its pH as low as 3.0 to 4.0, even when used as a topping on food products and baked. In addition, rust formation in production facilities, etc., is not promoted, and the flavor is improved with reduced sourness, in spite of its low pH.

Moreover, the acidic oil-in-water type emulsified condiment of the present invention can form a curved topping even by discharge from a narrow-mouthed nozzle and line drawing, and can prevent its surface from cracking or splitting even when baked. In addition, rust formation in production facilities, etc., is not promoted, and the flavor is improved with reduced sourness, in spite of its low pH.

DETAILED DESCRIPTION OF THE PREFERRED EMBODIMENTS

Figure 1:
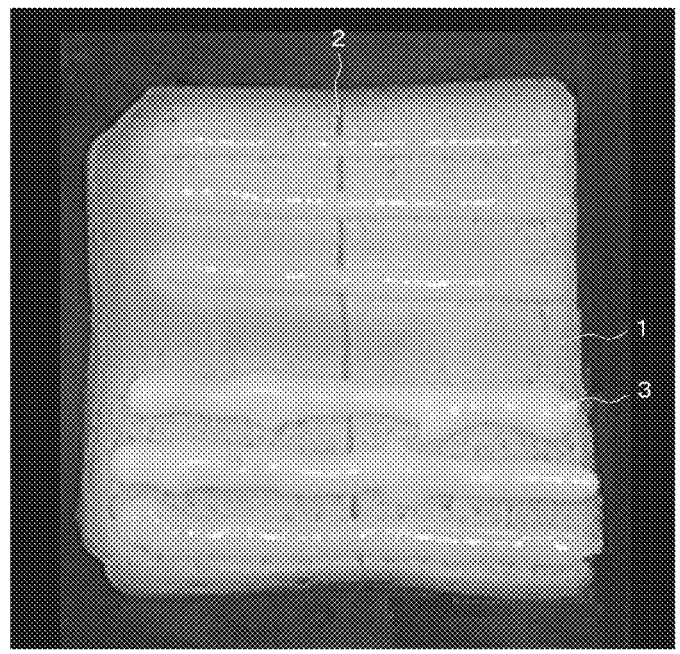
FIG. 1 is a photograph illustrating a baking resistance test method.

Hereinafter, the present invention will be described in detail. In the present invention, the term "part" means "part by mass," and the term "%" means "% by mass," unless otherwise specified.

<Features of Present Invention>

The acidic oil-in-water type emulsified condiment of the present invention is an acidic oil-in-water type emulsified condiment, such as a mayonnaise, a dressing, or a tartar sauce, containing an edible oil, water, a thickener, a yolk, and a volatile acid such as acetic acid. As mentioned later, its pH is 3.0 to 4.0, which is lower than that of a conventional acidic oil-in-water type emulsified condiment used as a topping on bread, pizza, or the like. By virtue of this low pH, the acidic oil-in-water type emulsified condiment of the present invention is particularly useful as a topping material to be baked.

The acidic oil-in-water type emulsified condiment of the present invention also contains a nonvolatile acid in combination with the volatile acid as acid agents. The content of the volatile acid and the content of the nonvolatile acid are set to a specific ratio. As a result, rust formation in production facilities, etc., is not promoted, and the flavor is improved with reduced sourness, in spite of its low pH.

<pH>

The pH of the acidic oil-in-water type emulsified condiment of the present invention is 3.0 or higher and 4.0 or lower. The acidic oil-in-water type emulsified condiment having a pH of 4.0 or lower, further 3.7 or lower, and particularly 3.6 or lower can be used as a topping on cooking ingredients and can maintain the smoothness and moderate flowability of the baked topping even if the cooking ingredients are baked at 180 to 250° C. in an oven or the like. Therefore, the baked topping can be prevented from cracking or splitting even if the food products swell during the baking or external forces or the like are applied to the baked food products.

The acidic oil-in-water type emulsified condiment of the present invention having a pH of 3.0 or higher and particularly 3.2 or higher can have a preferred state that resists degeneration caused by baking.

In the present invention, the pH can be adjusted by adjusting the amounts of acid agents, a protein or a proteolytic digest thereof, an amino acid, and the like to be mixed.

<Viscosity>

The acidic oil-in-water type emulsified condiment of the present invention has a viscosity (20° C.) of preferably 50 Pa·s or higher, particularly preferably 60 Pa·s or higher, 70 Pa·s or higher, or 75 Pa·s or higher, further preferably 100 Pa·s or higher such that the acidic oil-in-water type emulsified condiment applied to a food product surface does not run off the food product surface when heated in an oven, a steamer, or the like.

On the other hand, the viscosity is preferably 600 Pa·s or lower, more preferably 500 Pa·s or lower, particularly preferably 400 Pa·s or lower, such that the acidic oil-in-water type emulsified condiment forms a topping having a desired pattern by, for example, discharge from a narrow-mouthed nozzle and line drawing on food products such as bread, and easily produces good texture when heated and then cooled.

In this context, the viscosity is a value calculated from a reading 1 minute after the start of measurement by assaying a test sample having a product temperature of 20° C. in a BH type viscometer under conditions involving the number of rotations of 2 rpm using rotor No. 4 when the viscosity is 37.5 Pa·s or higher and lower than 75 Pa·s, rotor No. 5 when the viscosity is 75 Pa·s or higher and lower than 150 Pa·s, rotor No. 6 when the viscosity is 150 Pa·s or higher and lower than 375 Pa·s, and rotor No. 7 when the viscosity is 375 Pa·s or higher.

In the present invention, the viscosity can be adjusted by adjusting the amounts of a thickener, an edible oil, and the like to be mixed.

<Acid Agent>

In the acidic oil-in-water type emulsified condiment of the present invention, a volatile acid and a nonvolatile acid are used as acid agents for adjusting the pH to 3.0 or higher and 4.0 or lower, particularly 3.2 or higher and 3.7 or lower, or 3.2 or higher and 3.6 or lower.

In this context, the volatile acid refers to an inorganic acid or an organic acid that volatilizes at normal temperature and pressure. Of these acids, the organic acid according to the present invention refers to an acid having two or less carbon chains.

<Volatile Acid>

Heretofore, acetic acid, which is a volatile acid, has been widely used as an acid agent in acidic oil-in-water type emulsified condiments. In the present invention, an organic acid such as acetic acid or propionic acid, or an inorganic acid such as hydrochloric acid, chloric acid, or nitric acid can be used as the volatile acid.

Any one of the volatile organic acids and the volatile inorganic acids mentioned above may be used as the volatile acid, or two or more of these acids may be appropriately used in combination. The volatile acid preferably includes acetic acid from the viewpoint of flavor.

<Nonvolatile Acid>

An acid other than the volatile acid mentioned above is used as the nonvolatile acid. More specifically, one of or an appropriate combination of two or more of organic acids such as citric acid, malic acid, phosphoric acid, lactic acid, succinic acid, fumaric acid, and gluconic acid can be used as the nonvolatile acid.

Among others, two or more nonvolatile acids are preferably used in combination from the viewpoint of flavor.

<Ratio Between Content of Volatile Acid and Content of Nonvolatile Acid>

The ratio between the content of the volatile acid and the content of the nonvolatile acid is preferably 1:50 or larger and 20:1 or smaller, particularly preferably 1:50 or larger and 15:1 or smaller, in terms of mass ratio. Provided that the ratio of the volatile acid to the nonvolatile acid is 20 or smaller and particularly 15 or smaller, the acids can be prevented from causing rust to form on metal parts of production facilities, containers, etc., for the acidic oil-in-water type emulsified condiment, even if its pH is adjusted to 4.0 or lower.

In contrast to this, if the ratio of the volatile acid to the nonvolatile acid is smaller than 1/50 or particularly if the acidic oil-in-water type emulsified condiment contains no volatile acid, its flavor is deteriorated. On the other hand, if this ratio is larger than 20, the resulting acidic oil-in-water type emulsified condiment is more likely to cause rust to form on metal parts of its production facilities, containers, etc. In addition, sourness is strongly felt upon eating.

<Edible Oil>

The acidic oil-in-water type emulsified condiment of the present invention can contain an edible oil as a principal ingredient of an oil phase.

The edible oil is not particularly limited as long as the edible oil is any of various edible oils used in conventional acidic oil-in-water type emulsified condiments. Specifically, one of or a combination of two or more of, for example, animal or plant oils (e.g., rapeseed oil, soybean oil, corn oil, safflower oil, sunflower oil, cottonseed oil, sesame oil, rice oil, palm oil, palm olein, olive oil, peanut oil, coconut oil, perilla oil, cream, beef tallow, lard, and fish oil) and oils obtained by their chemical or enzymatic treatment, such as purified oils, medium-chain fatty acid triglycerides, and transesterified oils, can be contained in the acidic oil-in-water type emulsified condiment.

An approach for allowing the edible oil to be contained in the acidic oil-in-water type emulsified condiment may involve mixing raw materials, such as dairy cream or milk, containing the edible oil as raw materials for the production of the acidic oil-in-water type emulsified condiment.

In the acidic oil-in-water type emulsified condiment of the present invention, the content of the edible oil is 1% or larger and 40% or smaller, 5% or larger and 35% or smaller, and particularly 20% or larger and 35% or smaller from the viewpoint of facilitating forming a topping having a desired pattern such that the acidic oil-in-water type emulsified condiment applied to a food product surface does not run off the food product surface, and from the viewpoint of improving texture.

<Water>

In the acidic oil-in-water type emulsified condiment of the present invention, water is contained by using water as a raw material for the production of the acidic oil-in-water type emulsified condiment or contained as water contained in the acid agents, a thickener, a yolk, and the like.

In the acidic oil-in-water type emulsified condiment of the present invention, the content of the water is 30% or larger and 60% or lower.

<Thickener>

The acidic oil-in-water type emulsified condiment of the present invention contains a thickener such that its viscosity (20° C.) is 50 Pa·s or higher as mentioned above. The acidic oil-in-water type emulsified condiment containing the thickener easily maintains the shape of a formed topping when a curved topping is formed on prepared food products.

The thickener is not particularly limited as long as the thickener is edible. Examples thereof include starches and gum substances. One or two or more of the specific examples of the thickener mentioned later can be used.

Examples of the gum substances include carrageenan, tamarind seed gum, locust bean gum, xanthan gum, guar gum, tara gum, Cassia gum, glucomannan, gelatin, agar, gellan gum, and gum arabic.

Examples of the starches include potato starch, corn starch, tapioca starch, wheat starch, rice starch, processed starches obtained by a treatment, such as gelatinization or cross-linking, of these starches, and their heat-moisture treated starches.

<Yolk>

An edible yolk generally used can be used as the yolk. Examples thereof include raw yolk as well as the raw yolk subjected to one or two or more treatments such as sterilization, freezing, drying (e.g., spray drying or freeze drying), an enzymatic treatment with phospholipase A1, phospholipase A2, phospholipase C, phospholipase D, or protease, etc., desugaring with yeast or glucose oxidase, etc., decholesterolization (e.g., a supercritical carbon dioxide treatment), and mixing with common salt or sugars, etc. Particularly, the enzymatically treated yolk mentioned above, particularly, the yolk enzymatically treated with phospholipase A1 or phospholipase A2, i.e., lysed yolk, can be used from the viewpoint of stabilizing the dispersed state of oil droplets.

In the acidic oil-in-water type emulsified condiment of the present invention, the content of the yolk can be 0.1% or larger and 5% or smaller (in terms of solid content). Particularly, the acidic oil-in-water type emulsified condiment preferably contains 0.5% or larger and 4% or smaller (in terms of solid content) of the yolk and more preferably contains 1% or larger and 3% or smaller (in terms of solid content) of the yolk, from the viewpoint of preventing cracking or splitting.

<Sugar>

The acidic oil-in-water type emulsified condiment of the present invention can optionally contain a sugar. The acidic oil-in-water type emulsified condiment containing the sugar exhibits improved spreadability and thus facilitates drawing a pattern when the topping pattern is drawn with the acidic oil-in-water type emulsified condiment discharged from a narrow-mouthed nozzle. Furthermore, the acidic oil-in-water type emulsified condiment containing the sugar has a decreased water activity and improved preservation properties, while cracking or splitting in the baked acidic oil-in-water type emulsified condiment can also be further reduced.

Examples of the sugar include: monosaccharides such as glucose, galactose, fructose, mannose, and N-acetylglucosamine; disaccharides such as lactose, maltose, sucrose, cellobiose, and trehalose; oligosaccharides in which 3 to 7 monosaccharides are bonded; glucose-fructose syrup; and sugar alcohols obtained by the reduction treatment of these sugars. On the other hand, starches or gum substances for use as the thickener are not included in the sugar described herein.

In the acidic oil-in-water type emulsified condiment, the content of the sugar is preferably 3% or larger and 40% or smaller, more preferably 3% or larger and 35% or smaller, 5% or larger and 35% or smaller, or 5% or larger and 30% or smaller, particularly preferably 10% or larger and 30% or smaller, from the viewpoint of improving the easy drawing of a pattern at the time of topping formation and preventing cracking or splitting in the baked acidic oil-in-water type emulsified condiment.

<Protein>

The acidic oil-in-water type emulsified condiment of the present invention can contain a protein. The protein contained therein can also further reduce cracking or splitting in the baked acidic oil-in-water type emulsified condiment. In this context, the content of the protein can be 0.2% or larger and 3% or smaller.

The mass ratio of the content of the sugar to the content of the protein is 1 or larger and 200 or smaller and particularly 5 or larger and 50 or smaller from the viewpoint of preventing cracking or splitting in the baked acidic oil-in-water type emulsified condiment.

<Other Ingredients>

The acidic oil-in-water type emulsified condiment of the present invention can contain ingredients appropriately selected from various raw materials usually used in acidic oil-in-water type emulsified condiments, in addition to the ingredients mentioned above without impairing the effects of the present invention. Examples thereof can include: various seasoning agents such as sodium glutamate and common salt; antioxidants such as ascorbic acid and salts thereof, and vitamin E; spices such as various extracts, mustard flour, and pepper; proteolytic digests; dice-shaped boiled eggs; and chopped vegetables such as pickled cucumbers, onions, and parsley.

<Water Activity>

The acidic oil-in-water type emulsified condiment of the present invention preferably contains the ingredients mentioned above in their respective amounts to be mixed appropriately adjusted such that the water activity is 0.90 or higher and 0.96 or lower. The acidic oil-in-water type emulsified condiment having a water activity of 0.90 or higher and 0.96 or lower, 0.90 or higher and 0.95 or lower, 0.90 or higher and 0.94 or lower, and particularly 0.92 or higher and 0.95 or lower, or 0.92 or higher and 0.94 or lower can be prevented from cracking or splitting when baked.

<Dissolved Oxygen Concentration>

The acidic oil-in-water type emulsified condiment of the present invention is produced by mixing the ingredients mentioned above such that the dissolved oxygen concentration is 0.1% $O_2$ or higher and 10% $O_2$ or lower. This can prevent rust formation caused by the acidic oil-in-water type emulsified condiment.

The dissolved oxygen concentration indicated by "% $O_2$" is a dissolved oxygen concentration determined with an oxygen partial pressure in a substance as an index. For example, the state in which oxygen is dissolved in a liquid in air of 1 atm until saturation is 20.9% $O_2$, which is the same as the oxygen partial pressure in air, irrespective of the type of the liquid. Use of the unit "% $O_2$" can conveniently and accurately indicate the dissolved oxygen concentration of the acidic oil-in-water type emulsified condiment.

The dissolved oxygen concentration can be measured using a polarographic oxygen analyzer (DOL-40 manufactured by DKK-TOA Corp.), a fluorescent oxygen analyzer (OxySense 101 manufactured by OxySense, Inc., USA), or the like.

A known deoxidation method can be adopted to adjust the dissolved oxygen concentration of the acidic oil-in-water type emulsified condiment to within the range mentioned above. For example, a bubbling method which involves blowing an inert gas such as nitrogen or argon into a tank or a pipe storing raw materials such as an edible oil, vinegar, a yolk, or fresh water so that dissolved oxygen is replaced with the inert gas, a bubbling method which involves similarly blowing an inert gas into the acidic oil-in-water type emulsified condiment before packaging in a container, an evacuation method which involves reducing pressure during the mixing of various raw materials using a mixer to remove dissolved oxygen, or a method using an enzyme as disclosed in National Publication of International Patent Application No. 1999-504963 described above can be appropriately adopted.

Of these inert gases, nitrogen is particularly suitable as the inert gas because nitrogen is present in large amounts in air and thus available at a relatively low cost, and also has no influence on the flavor and quality of the acidic oil-in-water type emulsified condiment.

It is also desirable to adopt a production line in a closed system such that the acidic oil-in-water type emulsified condiment during production is not contaminated with oxygen in air.

<Method for Producing Acidic Oil-in-Water Type Emulsified Condiment>

In the method for producing the acidic oil-in-water type emulsified condiment of the present invention, the raw materials mentioned above can be mixed by a routine method to produce the acidic oil-in-water type emulsified condiment. Examples thereof can include a method which involves: uniformly mixing the acid agents, the thickener, the yolk, and seasoning agents as aqueous-phase raw materials at lower than 70° C.; crudely emulsifying the mixture by pouring the edible oil as an oil-phase raw material with stirring using a mixer or the like; next, finely emulsifying the mixture using a colloid mill or the like; and then filling, for example, a bottle container, a glass container, or a resin container having a mouth of 2 to 7 mm in diameter with the resulting emulsion, followed by hermetically sealing. Any of various bottles or pouches having such a mouth can be used as the resin container having a mouth of 2 to 7 mm in diameter.

EXAMPLES

Hereinafter, the acidic oil-in-water type emulsified condiment of the present invention will be further described with reference to Examples and Comparative Examples.

Examples 1 to 8 and Comparative Examples 1 to 3

Each acidic oil-in-water type emulsified condiment was produced at a yield of 100 kg using the raw materials of Table 1 as follows: aqueous-phase raw materials were uniformly mixed using a mixer to prepare an aqueous-phase portion. In this operation, dissolved oxygen was removed under reduced pressure. Subsequently, while this aqueous-phase portion was stirred, rapeseed cooking oil was gradually poured thereinto as an edible oil to prepare a crude emulsion. Then, the obtained crude emulsion was finishing-emulsified using a colloid mill. Each 200 mL nylon plastic bag was filled with 150 g of the emulsion and hermetically sealed.

The respective protein contents of Examples and Comparative Examples were calculated from values measured in accordance with the nitrogen quantitation conversion method described in Column 3 of Appendix 2 of the Nutrition Labelling Standards (Notice No. 176 of the Ministry of Health, Labour and Welfare, Japan, Apr. 24, 2003).

Evaluation

The acidic oil-in-water type emulsified condiment obtained in each Example or Comparative Example was assayed for (a) dissolved oxygen concentration, (b) pH, (c) water activity, and (d) viscosity. In this case, the viscosity was measured using a BH type viscometer and rotor No. 4 when the viscosity was 37.5 Pa·s or higher and lower than 75 Pa·s, rotor No. 5 when the viscosity was 75 Pa·s or higher and lower than 150 Pa·s, and rotor No. 6 when the viscosity was 150 Pa·s or higher and lower than 375 Pa·s, and determined from a reading after the rotor made two turns after the start of the measurement.

Also, (e) rust formation test and (f) baking resistance test were conducted as follows.

(e) Rust Formation Test

Testing Method 5 g of mayonnaise was applied to a tin plate (3 cm×3 cm), which was then placed in a closed container and stored at 55° C. for 1 month, followed by the confirmation of the rust formation status.

The rust measurement method was carried out as follows in accordance with the rust preventive oil evaluation method of JIS (http://www.jalos.jp/jalos/qa/articles/005-L110.htm).

Evaluation Criteria

A: No rust is observed.

B: Rust is observed.

C: Rust is observed on more than half of the surface of the tin plate.

(f) Baking Resistance Test

Testing Method

As shown in FIG. 1, a cut line 2 was created at the center of a slice of white bread 1 having a thickness of approximately 1.5 cm such that the thickness of the cut line was half of the thickness of the slice of white bread. Next, linear toppings 3 were formed from the acidic oil-in-water type emulsified condiment using a piping bag with a round nozzle having a mouth of 5 mm in diameter so as to perpendicularly intersect the cut line 2, and baked for 15 minutes in an oven of 200° C. Subsequently, as shown in FIG. 2, the baked slice of white bread 1 was divided into two portions along the cut line 2 and evaluated for easy cutting of the linear toppings 3.

Figure 2:
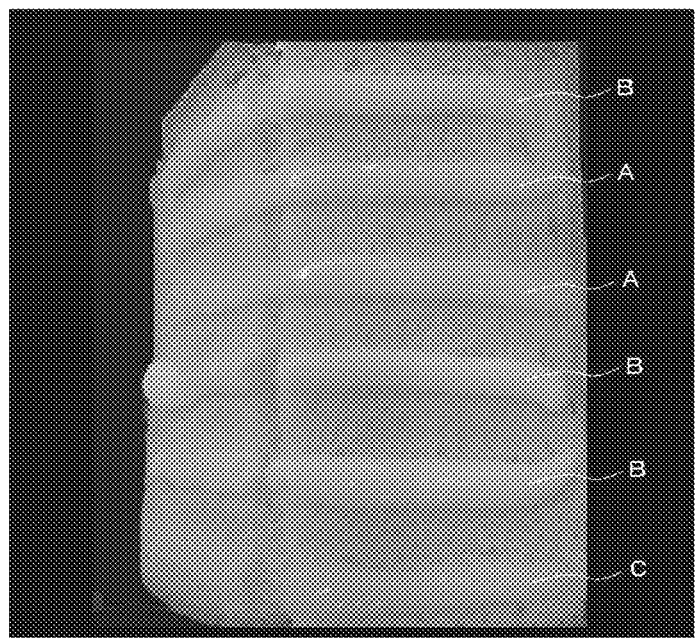
FIG. 2 is a photograph illustrating evaluation criteria in the baking resistance test method.

Evaluation Criteria (see FIG. 2)

A: The toppings are cut by splitting only after the acidic oil-in-water type emulsified condiment stretched by approximately 5 mm.

B: The toppings are cut by splitting while the acidic oil-in-water type emulsified condiment rarely stretched.

C: The toppings split before the slice of white bread is divided into two portions.

The results of measuring (b) pH, (c) water activity, and (d) viscosity and the results of (e) rust formation test and (f) baking resistance test as described above are shown in Table 1. The dissolved oxygen concentration fell within the range of 0.1 to 10% $O_2$ for all of the samples.

The results of the rust formation test demonstrate that the acidic oil-in-water type emulsified condiments of Examples 1 to 8 in which the ratio between the volatile acid and the nonvolatile acid falls within the range of 1:50 to 20:1 are less likely to cause rust to form on the tin plate, whereas the acidic oil-in-water type emulsified condiment of Comparative Example 3 having a larger ratio of the volatile acid easily causes rust to form on the tin plate.

The results of the baking resistance test demonstrate that the acidic oil-in-water type emulsified condiments of Examples 1 to 8 having a pH in the range of 3.0 to 4.0 and a water activity in the range of 0.90 to 0.96 are less likely to crack or split in the baked topping. By contrast, the acidic oil-in-water type emulsified condiment of Comparative Example 1 having a water activity of 0.97 and the acidic oil-in-water type emulsified condiment of Comparative Example 2 having a pH of 4.6 are inferior in the results of the baking resistance test and are found to be susceptible to cracking or splitting in the baked topping.

Evaluation was conducted in accordance with the testing method of (f) baking resistance test except that the piping bag with a round nozzle having a mouth of 5 mm in diameter used in the testing method of (f) baking resistance test was changed to a resin bottle having a mouth of 3 mm in diameter. This evaluation produced similar results as in the piping bag with a round nozzle having a mouth of 5 mm in diameter.

TABLE 1

| | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Raw material | | | | | | | | | | | |
| Fresh water | 51.9 | 38.6 | 55.6 | 54.3 | 52.0 | 45.1 | 52.0 | 50.0 | 74.5 | 56.7 | 22.0 |
| Fermented vinegar (4% acetic acid) | 4.5 | 18.3 | 0.45 | 4.5 | 4.5 | 4.5 | 4.5 | 4.5 | 4.5 | 0.35 | 27.75 |
| Citric acid | 0.135 | 0.018 | 0.360 | 0.135 | 0.135 | 0.135 | 0.135 | 0.135 | 0.135 | 0 | 0.001 |
| Malic acid | 0.135 | 0.018 | 0.360 | 0.135 | 0.135 | 0.135 | 0.135 | 0.135 | 0.135 | 0 | 0.001 |
| Common salt | 2.3 | 2.3 | 2.3 | 2.3 | 2.3 | 2.3 | 2.3 | 2.3 | 2.30 | 2.3 | 2.3 |
| Sodium glutamate | 0.4 | 0.2 | 0.4 | 0.1 | 0.4 | 0.0 | 0.0 | 0.0 | 0.10 | 0.1 | 0 |
| Aqueous crystalline glucose (glucose content: 91%) | 22.3 | 22.3 | 22.3 | 0.0 | 22.3 | 11.1 | 22.3 | 22.3 | 0.0 | 22.3 | 11.1 |
| Sucrose | 0.0 | 0.0 | 0.0 | 20.3 | 0.0 | 10.2 | 0.0 | 0.0 | 0.0 | 0 | 10.2 |
| 10% salted yolk | 3.3 | 3.3 | 3.3 | 3.3 | 3.3 | 3.3 | 3.3 | 3.3 | 3.3 | 3.3 | 3.3 |
| Sterilized albumen | 0.0 | 0.0 | 0.0 | 0.0 | 0.0 | 8.0 | 0.1 | 2.0 | 0.0 | 0 | 8 |
| Processed starch | 5.0 | 5.0 | 5.0 | 5.0 | 5.0 | 5.0 | 5.0 | 5.0 | 5.0 | 5 | 5 |
| Xanthan gum | 0.0 | 0.0 | 0.0 | 0.0 | 0.0 | 0.3 | 0.3 | 0.3 | 0.0 | 0 | 0.3 |
| Edible oil (rapeseed cooking oil) | 10.0 | 10.0 | 10.0 | 10.0 | 10.0 | 10.0 | 10.0 | 10.0 | 10.0 | 10 | 10 |
| Total | 100.0 | 100.0 | 100.0 | 100.0 | 100.0 | 100.0 | 100.0 | 100.0 | 100.0 | 100 | 100 |
| Data | | | | | | | | | | | |
| Content of volatile acid (%) | 0.180 | 0.730 | 0.018 | 0.180 | 0.180 | 0.180 | 0.180 | 0.180 | 0.180 | 0.014 | 1.110 |
| Content of nonvolatile acid (%) | 0.270 | 0.036 | 0.720 | 0.270 | 0.270 | 0.270 | 0.270 | 0.270 | 0.270 | 0.000 | 0.002 |
| Ratio between volatile acid and nonvolatile acid | 2:3 | 20:1 | 1:40 | 2:3 | 2:3 | 2:3 | 2:3 | 2:3 | 2:3 | — | 555:1 |
| Sugar content (%) | 20.3 | 20.3 | 20.3 | 20.3 | 20.2 | 20.3 | 20.3 | 20.3 | 0.0 | 20.3 | 20.3 |
| Protein content (%) | 0.5 | 0.5 | 0.5 | 0.5 | 0.5 | 1.3 | 0.5 | 0.7 | 0.5 | 0.5 | 1.3 |
| Sugar content/protein content | 41 | 41 | 41 | 41 | 41 | 16 | 41 | 29 | 0 | 41 | 16 |
| pH | 3.2 | 3.2 | 3.2 | 3.2 | 3.2 | 3.4 | 3.3 | 3.3 | 3.3 | 4.6 | 3.4 |
| Water activity | 0.93 | 0.93 | 0.95 | 0.94 | 0.94 | 0.94 | 0.94 | 0.94 | 0.97 | 0.94 | 0.94 |
| Viscosity (Pa·s) | 60 | 55 | 70 | 60 | 60 | 220 | 60 | 100 | 70 | 40 | 200 |
| Rust formation test | A | B | A | A | A | A | A | A | A | A | C |
| Baking resistance test | A | B | A | A | A | A | A | A | C | C | A |

Example 9

An acidic oil-in-water type emulsified condiment was obtained in the same way as in Example 1 except that in Example 1, 4.4% of fermented vinegar (4% acetic acid) and 0.01% of hydrochloric acid were used as volatile acids, and 0.25% of citric acid, 0.01% of phosphoric acid, and 0.01% of lactic acid were used as nonvolatile acids. The obtained acidic oil-in-water type emulsified condiment had a pH of 3.3 and a water activity of 0.93. Also, this acidic oil-in-water type emulsified condiment scored A in the results of both the rust formation test and the baking resistance test.

Example 10

An acidic oil-in-water type emulsified condiment was obtained in the same way as in Example 1 except that in Example 1, 0.25% of citric acid, 0.01% of gluconic acid, and 0.01% of succinic acid were used as nonvolatile acids. The obtained acidic oil-in-water type emulsified condiment had a pH of 3.5 and a water activity of 0.93. Also, this acidic oil-in-water type emulsified condiment scored A in the results of both the rust formation test and the baking resistance test.

Example 11

An acidic oil-in-water type emulsified condiment was obtained in the same way as in Example 1 except that in Example 1, 0.25% of citric acid and 0.02% of fumaric acid were used as nonvolatile acids. The obtained acidic oil-in-water type emulsified condiment had a pH of 3.5 and a water activity of 0.93. Also, this acidic oil-in-water type emulsified condiment scored A in the results of both the rust formation test and the baking resistance test.

Example 12

An acidic oil-in-water type emulsified condiment was obtained in the same way as in Example 1 except that in Example 1, 20% of aqueous crystalline glucose and 1% of fructose were used as sugars. The obtained acidic oil-in-water type emulsified condiment had a pH of 3.5 and a water activity of 0.95. Also, this acidic oil-in-water type emulsified condiment scored A in the results of both the rust formation test and the baking resistance test.

Example 13

An acidic oil-in-water type emulsified condiment was obtained in the same way as in Example 1 except that in Example 1, 20% of aqueous crystalline glucose and 1% of sorbitol were used as sugars. The obtained acidic oil-in-water type emulsified condiment had a pH of 3.5 and a water activity of 0.95. Also, this acidic oil-in-water type emulsified condiment scored A in the results of both the rust formation test and the baking resistance test.

Example 14

An acidic oil-in-water type emulsified condiment was obtained in the same way as in Example 1 except that in Example 1, 20% of aqueous crystalline glucose and 1% of polydextrose were used as sugars. The obtained acidic oil-in-water type emulsified condiment had a pH of 3.5 and a water activity of 0.95. Also, this acidic oil-in-water type emulsified condiment scored A in the results of both the rust formation test and the baking resistance test.

Examples 15 to 18 and Comparative Examples 4 and 5

Each acidic oil-in-water type emulsified condiment was obtained in the same way as in Example 1 except that the raw materials of Table 2 were used.

The obtained acidic oil-in-water type emulsified condiments were tested as described above.

The respective protein contents of Examples and Comparative Examples were calculated from values measured in accordance with the nitrogen quantitation conversion method described in Column 3 of Appendix 2 of the Nutrition Labelling Standards (Notice No. 176 of the Ministry of Health, Labour and Welfare, Japan, Apr. 24, 2003).

The results of measuring (b) pH, (c) water activity, and (d) viscosity and the results of (e) rust formation test and (f) baking resistance test are shown in Table 2. The dissolved oxygen concentration (a) fell within the range of 0.1 to 10% $O_2$ for all of the samples.

The results of the rust formation test demonstrate that the acidic oil-in-water type emulsified condiments of Examples 15 to 18 in which the ratio between the volatile acid and the nonvolatile acid falls within the range of 1:50 to 20:1 are less likely to cause rust to form on the tin plate, whereas the acidic oil-in-water type emulsified condiment of Comparative Example 4 having a larger ratio of the volatile acid easily causes rust to form on the tin plate.

The results of the baking resistance test demonstrate that the acidic oil-in-water type emulsified condiments of Examples 15 to 18 having a pH in the range of 3.0 to 4.0 and a water activity in the range of 0.90 to 0.96 are less likely to crack or split in the baked topping. In addition, the acidic oil-in-water type emulsified condiments of Examples 15 to 17 having a pH of 3.0 to 3.6 are found to be far less likely to crack or split in the baked topping.

By contrast, the acidic oil-in-water type emulsified condiment of Comparative Example 5 having a water activity of 0.98 is inferior in the results of the baking resistance test and is found to be susceptible to cracking or splitting in the baked topping.

TABLE 2

|  | Example 15 | Example 16 | Example 17 | Example 18 | Comparative Example 4 | Comparative Example 5 |
|---|---|---|---|---|---|---|
| Raw material |  |  |  |  |  |  |
| Fresh water | 50.2 | 34.7 | 43.3 | 52.0 | 42.5 | 27.0 |
| Fermented vinegar (4% acetic acid) | 7.7 | 4.5 | 4.5 | 4.4 | 14.3 | 6.0 |
| Citric acid | 0.015 | 0.135 | 0.135 | 0.130 | 0.0075 | 0.000 |
| Malic acid | 0.015 | 0.135 | 0.135 | 0.130 | 0.0075 | 0.000 |

TABLE 2-continued

|  | Example 15 | Example 16 | Example 17 | Example 18 | Comparative Example 4 | Comparative Example 5 |
|---|---|---|---|---|---|---|
| Lactic acid | 0.0 | 0.0 | 0.0 | 0.0 | 0.0 | 0.40 |
| Common salt | 2.4 | 2.3 | 2.3 | 2.3 | 2.3 | 0.25 |
| Sodium glutamate | 0.2 | 0.4 | 0.4 | 0.5 | 0.4 | 0.0 |
| Aqueous crystalline glucose (glucose content: 91%) | 22.3 | 30.0 | 20.0 | 22.3 | 22.3 | 0.0 |
| Sucrose | 0.0 | 0.0 | 15.0 | 0.0 | 0.0 | 2.75 |
| 10% salted yolk | 2.2 | 3.3 | 3.3 | 3.3 | 3.3 | 6.6 |
| Skimmed milk | 0.0 | 0.0 | 0.0 | 0.0 | 0.0 | 2.0 |
| Processed starch | 5.0 | 4.5 | 6.0 | 5.0 | 5.0 | 0.0 |
| Xanthan gum | 0.0 | 0.0 | 0.0 | 0.0 | 0.0 | 0.0 |
| Soybean oil | 10.0 | 20.0 | 5.0 | 10.0 | 10.0 | 55.0 |
| Total | 100.0 | 100.0 | 100.0 | 100.0 | 100.0 | 100.0 |
| Data |  |  |  |  |  |  |
| Content of volatile acid (%) | 0.3 | 0.18 | 0.18 | 0.18 | 0.6 | 0.24 |
| Content of nonvolatile acid (%) | 0.03 | 0.27 | 0.27 | 0.26 | 0.015 | 0.4 |
| Ratio between volatile acid and nonvolatile acid | 10:1 | 2:3 | 2:3 | 9:13 | 40:1 | 3:5 |
| Sugar content (%) | 20.2 | 27.3 | 33.2 | 20.2 | 20.2 | 2.8 |
| Protein content (%) | 0.3 | 0.5 | 0.5 | 0.5 | 0.5 | 1.7 |
| Sugar content/protein content | 62 | 56 | 68 | 41 | 41 | 2 |
| pH | 3.6 | 3.4 | 3.5 | 3.9 | 3.6 | 3.9 |
| Water activity | 0.94 | 0.90 | 0.91 | 0.94 | 0.93 | 0.98 |
| Viscosity (Pa·s) | 138 | 255 | 253 | 140 | 153 | 88 |
| Rust formation test | A | A | A | A | C | C |
| Baking resistance test | A | A | A | B | A | C |

REFERENCE SIGNS LIST

1: Slice of bread
2: Cut line
3: Topping

What is claimed is:

1. An acidic oil-in-water type emulsified condiment comprising:
   1 to 40% by mass of an edible oil,
   30 to 60% by mass of water,
   10 to 40% by mass of a sugar,
   a thickener, a yolk, a volatile acid, and a nonvolatile acid which is at least one selected from the group consisting of citric acid, malic acid, phosphoric acid, lactic acid, and succinic acid wherein the mass ratio between the content of the volatile acid and the content of the nonvolatile acid is 1:50 to 15:1, and the acidic oil-in-water type emulsified condiment has:
   a dissolved oxygen concentration of 0.1 to 10% $O_2$,
   a pH of 3.0 to 4.0,
   a water activity of 0.90 to 0.96, and
   a viscosity (20° C.) of 50 Pa·s or higher.

2. The acidic oil-in-water type emulsified condiment according to claim 1, wherein the sugar comprises one or more of sucrose, fructose, sorbitol, glucose, and polydextrose.

3. The acidic oil-in-water type emulsified condiment according to claim 1, wherein the acidic oil-in-water type emulsified condiment further comprises 0.2 to 3% by mass of a protein.

4. The acidic oil-in-water type emulsified condiment according to claim 3, wherein the ratio of the content of the sugar to the content of the protein is 5 to 50.

5. The acidic oil-in-water type emulsified condiment according to claim 1, wherein the viscosity (20° C.) is 50 Pa·s or higher and 600 Pa·s or lower.

6. The acidic oil-in-water type emulsified condiment according to claim 1 which is packaged in a resin container, the resin container having a mouth of 2 to 7 mm in diameter.

7. The acidic oil-in-water type emulsified condiment according to claim 2 which is packaged in a resin container, the resin container having a mouth of 2 to 7 mm in diameter.

8. The acidic oil-in-water type emulsified condiment according to claim 3 which is packaged in a resin container, the resin container having a mouth of 2 to 7 mm in diameter.

9. The acidic oil-in-water type emulsified condiment according to claim 4 which is packaged in a resin container, the resin container having a mouth of 2 to 7 mm in diameter.

10. The acidic oil-in-water type emulsified condiment according to claim 5 which is packaged in a resin container, the resin container having a mouth of 2 to 7 mm in diameter.

11. The acidic oil-in-water type emulsified condiment according to claim 2, wherein the acidic oil-in-water type emulsified condiment further comprises 0.2 to 3% by mass of a protein.

12. The acidic oil-in-water type emulsified condiment according to claim 11, wherein the ratio of the content of the sugar to the content of the protein is 5 to 50.

13. The acidic oil-in-water type emulsified condiment according to claim 2, wherein the viscosity (20° C.) is 50 Pa·s or higher and 600 Pa·s or lower.

14. The acidic oil-in-water type emulsified condiment according to claim 3, wherein the viscosity (20° C.) is 50 Pa·s or higher and 600 Pa·s or lower.

15. The acidic oil-in-water type emulsified condiment according to claim 4, wherein the viscosity (20° C.) is 50 Pa·s or higher and 600 Pa·s or lower.

* * * * *